(12) United States Patent
Saarni

(10) Patent No.: US 11,670,931 B2
(45) Date of Patent: Jun. 6, 2023

(54) TRANSMISSION CABLE JOINT FOR A MEDIUM VOLTAGE UNDERGROUND CABLE SYSTEM

(71) Applicant: Tammerfast Oy, Tampere (FI)

(72) Inventor: Atte Saarni, Vesilahti (FI)

(73) Assignee: Tammerfast Oy, Tampere (FI)

( * ) Notice: Subject to any disclaimer, the term of this patent is extended or adjusted under 35 U.S.C. 154(b) by 267 days.

(21) Appl. No.: 17/269,214

(22) PCT Filed: Aug. 30, 2019

(86) PCT No.: PCT/FI2019/050618
§ 371 (c)(1),
(2) Date: Feb. 17, 2021

(87) PCT Pub. No.: WO2020/043955
PCT Pub. Date: Mar. 5, 2020

(65) Prior Publication Data
US 2022/0368121 A1    Nov. 17, 2022

(30) Foreign Application Priority Data

Aug. 30, 2018  (FI) ..................................... 20185720

(51) Int. Cl.
*H02G 15/00* (2006.01)
*H02G 15/117* (2006.01)
(Continued)

(52) U.S. Cl.
CPC ............. *H02G 15/117* (2013.01); *H02G 9/02* (2013.01); *H02G 15/12* (2013.01); *H02H 9/08* (2013.01)

(58) Field of Classification Search
CPC ........ H02G 15/117; H02G 9/02; H02G 15/12; H02H 9/08
See application file for complete search history.

(56) References Cited

U.S. PATENT DOCUMENTS 3,691,294 A * 9/1972 Charles .................. H02G 15/12
206/718
3,808,353 A   4/1974 Burtelson
(Continued)

FOREIGN PATENT DOCUMENTS

CN    101666849 A    3/2010
CN    204439707 U    7/2015
(Continued)

OTHER PUBLICATIONS

China Office Action, Chinese Patent Application 201980056871.6, dated Mar. 18, 2022 (5 pages).
(Continued)

*Primary Examiner* — Pete T Lee
(74) *Attorney, Agent, or Firm* — Thomas | Horstemeyer, LLP

(57) ABSTRACT

The application relates to a transmission cable joint for a medium voltage underground cable system. The cable joint comprises at least a casing and connection terminals for coupling wires of transmission cables. In addition, the connection terminals are in connection with an inductance component that is sheltered by the casing and limits capacitive earth fault current, when the coupled cables produce such current.

8 Claims, 2 Drawing Sheets

(51) Int. Cl.
    *H02G 9/02*    (2006.01)
    *H02G 15/12*   (2006.01)
    *H02H 9/08*    (2006.01)

(56) References Cited

U.S. PATENT DOCUMENTS 6,124,550 A * 9/2000 Funken ................... H02K 3/40
                                                310/68 R
10,072,963 B1 * 9/2018 Solokhin ............... G01F 23/296

FOREIGN PATENT DOCUMENTS

| EP | 1684395 A2 | 7/2006 |
| EP | 2530804 A1 | 5/2012 |
| FR | 2753846 A1 | 3/1998 |
| FR | 2881002 A1 | 7/2006 |
| GB | 2254739 A  | 10/1992 |

OTHER PUBLICATIONS

European Search Report, EP Patent App. 19854653.3, dated Apr. 20, 2022.
Finnish Search Report dated Feb. 10, 2020 for FI Application No. 20185720.
Finnish Search Report dated Mar. 3, 2019 for FI Application No. 20185720.
International Search Report and Written Opinion issued for WO Application No.

* cited by examiner

Fig. 2

Table 8.2b. Earth fault currents for 10, 15, 20, and 30 kV cables [A/km], 50 Hz

| Cross-section mm² | 10 kV power cable | | | | 15 kV power cable | 20 kV power cable | | | | 30 kV power cable |
|---|---|---|---|---|---|---|---|---|---|---|
| | Paper insulated PLKVJ APAKM APLKPJJ | Paper insulated PLKVJ PVLKVJ AHPLKPJJA PLKPJJ APYAKMM | PEX insulated HXCMK AHXCMK AHXCMKR AHXCMKRM | XLPE insulated AHXCMK/-W AHXCMKR-WTC AHXCMK | XLPE insulated AX, FXLJ AX, FXKJ AX, FXTLK AX, FXPLK AX, FXBTLK | Paper insulated PYLKVJ AHPLKPJJ APYAKMM | PEX insulated HXCMK AHXCMK AHXCMKR AHXCMKRM | XLPE ins. AHXAMK-W AHXAMK-WP AHXCMK-WTC AHXCMK HXCMK | XLPE insulated AX, FXLJ AX, FXKJ AX, FXTLK AX, FXPLK AX, FXBTLK | XLPE insulated AX, FXLJ AX, FXKJ AX, FXTLK AX, FXPLK AX, FXBTLK |
| 3x25 | 0,8 | 1,3 | 1,0 | - | - | 2,1 | 1,6 | 1,5 | - | - |
| 3x35 | 0,8 | 1,4 | 1,1 | - | - | 2,3 | 1,7 | - | - | - |
| 3x50 | 0,9 | 1,7 | 1,3 | 1,3 | 1,6 | 2,5 | 1,9 | - | 1,7 | 2,1 |
| 3x70 | 1,0 | 1,9 | 1,4 | 1,4 | 1,7 | 2,8 | 2,0 | 2,0 | 2,0 | 2,4 |
| 3x95 | 1,1 | 2,3 | 1,6 | - | 2,0 | 3,2 | 2,2 | 2,3 | 2,3 | 2,6 |
| 3x120 | 1,2 | 2,5 | 1,7 | 1,8 | 1,9 | 3,5 | 2,3 | 2,4 | 2,5 | 2,9 |
| 3x150 | 1,3 | 2,7 | 1,8 | - | 2,0 | 3,7 | 2,5 | 2,6 | 2,7 | 3,1 |
| 3x185 | 1,4 | 3,0 | 1,9 | 2,1 | 2,2 | 4,0 | 2,8 | 2,8 | 2,9 | 3,3 |
| 3x240 | 1,5 | 3,2 | 2,2 | 2,4 | 2,4 | 4,5 | 2,9 | 3,2 | 3,2 | 3,6 |
| 3x300 | 1,5 | 3,4 | 2,4 | 2,6 | 2,7 | 4,9 | 3,1 | 3,5 | 3,5 | 3,9 |
| 3x1x35 | - | - | - | - | - | - | - | 1,7 | - | - |
| 3x1x50 | - | - | - | - | 1,3 | - | - | - | 1,7 | 2,1 |
| 3x1x70 | - | - | 1,4 | 1,4 | 1,4 | - | 2,0 | - | 2,0 | 2,4 |
| 3x1x95 | - | - | - | - | 1,7 | - | - | - | - | 2,6 |
| 3x1x120 | - | - | 1,8 | 1,9 | 1,8 | - | 2,3 | - | 2,5 | 2,8 |
| 3x1x150 | - | - | - | - | 2,1 | - | - | - | - | 3,1 |
| 3x1x185 | - | - | 2,1 | 2,1 | 2,2 | - | 2,6 | - | 2,9 | 3,3 |
| 3x1x240 | - | - | - | - | 2,5 | - | - | - | - | 3,6 |
| 3x1x300 | - | - | 2,6 | 2,6 | 2,7 | - | 3,5 | 3,6 | 3,5 | 3,9 |
| 3x1x400 | - | - | - | - | 2,9 | - | - | - | 3,9 | 4,2 |
| 3x1x500 | - | - | 3,3 | 3,3 | 3,3 | - | 4,2 | 4,4 | 4,3 | 4,7 |
| 3x1x630 | - | - | - | - | 3,7 | - | - | - | 4,8 | 5,2 |
| 3x1x800 | - | - | 4,1 | 4,1 | 4,1 | - | 5,3 | 5,4 | 5,3 | 5,9 |
| 3x1x1000 | - | - | - | - | 4,8 | - | - | - | 6,0 | 6,5 |
| 3x1x1200 | - | - | - | - | 5,7 | - | - | - | 6,4 | 7,0 |

TRANSMISSION CABLE JOINT FOR A MEDIUM VOLTAGE UNDERGROUND CABLE SYSTEM

CROSS-REFERENCE TO RELATED APPLICATIONS

This application is the 35 U.S.C. § 371 national stage application of PCT Application No. PCT/FI2019/050618, filed Aug. 30, 2019, where the PCT claims priority to, and the benefit of, FINNISH application no. 20185720, filed Aug. 30, 2018, both of which are herein incorporated by reference in their entireties.

TECHNICAL FIELD

The application relates generally to a transmission cable joint for a medium voltage underground cable system.

BACKGROUND

The electrical market law dictates and governs increasingly more strict demands for electrical distribution companies concerning the reliability of energy delivery, which leads to a trend to transfer from overhead lines towards cabling transmission lines underground.

Although there are many advantages with the underground cabling, there is one big disadvantage: earth fault currents that increase drastically during faults. Since underground cables produce about 40 times more capacitive earth fault current compared to conventional overhead lines, there is a demand for a development of compensating components and systems to limit earth fault currents in underground cablings.

One solution to limit earthfault currents is an adjustable Peterson (arc suppression) coil when inductive current is of opposite phase angle of conductive current and, thus, they may cancel each other out in RCL-circuits, if the values are correct. So, Peterson coil is usually connected to a neutral point in a main transformer in the station or to an artificial neutral through an earthtransformer, i.e. a ZN transformer.

However, its disadvantages are that this coil is expensive and a large component that requires complicated electronics and adjusting systems in order to operate properly. These adjusting systems should be usually compatible with SCADA (Supervisory Control And Data Acquisition) control architecture.

A further disadvantage is that Peterson coils produce large heat losses, whereupon it might require a separate housing, which naturally increases the total cost of component.

A further disadvantage is that only one Peterson coil is usually installed per a bus bar that makes the component critical and worsens the reliability of electric delivery when, during fault, it has to re-route whole station because of dangerous levels of ground voltages.

SUMMARY

One object of the invention is to withdraw prior art disadvantages and to provide an inexpensive and simple component that limits earth fault currents and couples transmission line cables in underground medium voltage (MV) cable systems.

One object of the invention is fulfilled by a transmission cable joint according to the independent claim.

One embodiment is a transmission cable joint for a MV underground cable system that comprises at least a casing and connection terminals for coupling wires of transmission cables. The connection terminals are in connection with an inductance component that is sheltered by the casing and limits capacitive earth fault current, when the coupled cables produce such current.

Further embodiments are defined in the dependent claims.

BRIEF DESCRIPTION OF THE FIGURES

The embodiments are presented with reference to the following figures:

FIG. 2 presents a table indicating earth fault currents for different MV transmission cables

DETAILED DESCRIPTION OF THE FIGURES

Nowadays MV transmission cables 101, 102 are coupled together with a prior art transmission joint, which is used everywhere in a grid, because many times it is not possible to dig one continuous cable 101, 102 from a station to next transformer because of e.g. distance or obstacles.

Figure 1A:
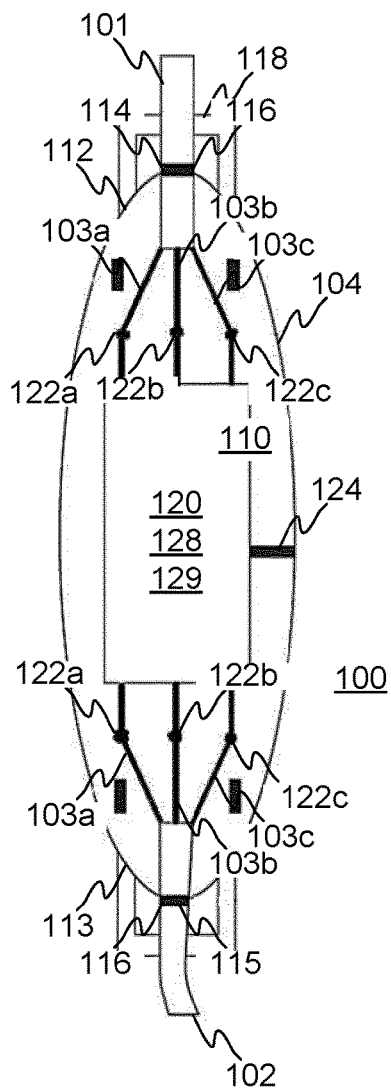
FIG. 1a presents a cable joint seen from above
Figure 1C:
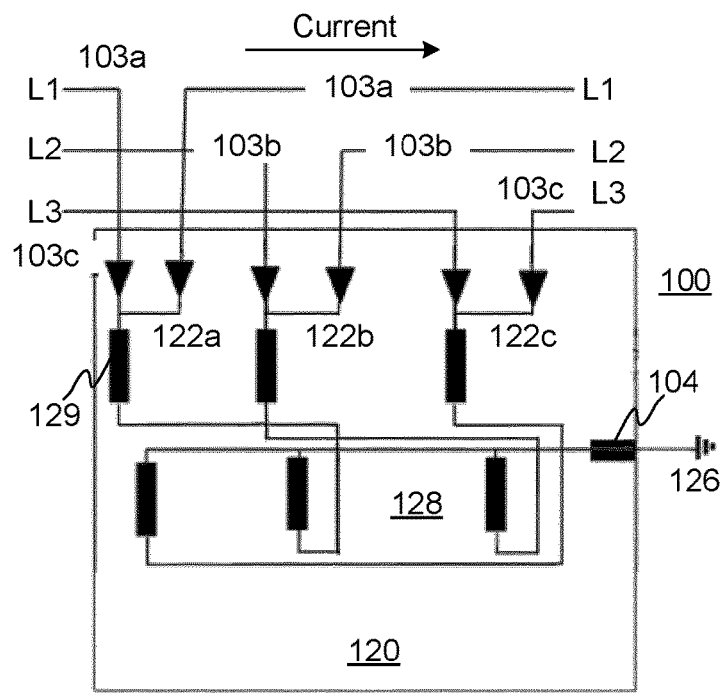
FIG. 1c presents a connection diagram of cable joint
Figure 1B:
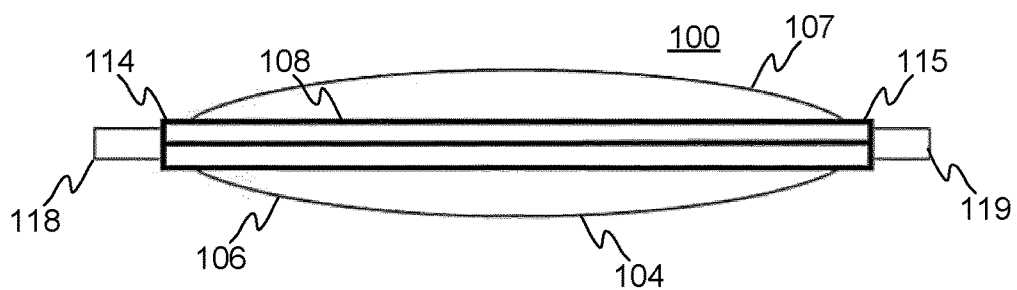
FIG. 1b presents a side view of cable joint

FIGS. 1a and 1b present a portable transmission cable joint 100 that couples MV transmission cables 101, 102 to each other. The cable joint 100 is suitable to dig and install in a ground, where it is used to couple a feeder cable 101 and a load cable 102 in cable systems of underground MV transmission lines.

The MV transmission cables 101, 102 are typically 1-100 kV cables, e.g. 10, 15, 20, or 30 kV cables, and each comprises cable wires 103a, 103b, 103c.

Each cable 101, 102 produces a certain amount of capacitive current and the table of FIG. 2 indicates some typical values for 10, 15, 20, and 30 kV cables 101, 102. The current is capacitive, because the structure of cable 101, 102 makes it basically a capacitor.

The cable joint 100 comprises a casing (casket) 104 that shelters other components 120, 122a, 122b, 122c, 124, 128 of cable joint 100 by encompassing those inside its structure.

The casing 104 comprises lower and upper casing parts 106, 107 with bolt flanges 108. A shape of casing parts 106, 107 are such that the casing parts 106, 107 attached to each other form a space 110 that enables to place the other components 120, 122a, 122b, 122c, 124, 128 inside the casing 104. The attachment of casing parts 106, 107 is carried out by means of attachment means, e.g. bolts or screws, through the bolt flanges 108.

Each casing part 106, 107 has a sections on its both end 112, 113 so that when the casing parts 106, 107 have been attached to each other, these sections form a cable opening 114, 115 to both ends 112, 113 for each cable 101, 102 to be coupled. Each opening 114, 115 allows the cable 101, 102 to protrude through it into space 110 inside the casing 104 so that a connection of cables 101, 102 is sheltered. The openings 114, 115 are sealed by means of a watertight seal 116 as well as another watertight seal is formed between the casing parts 106, 107 in order to seal the casing structure.

Since the casing 104 is portable, it should have such measurements, i.e. dimensions and weight, that it can be carried by one person or by two persons. Therefore, the casing 104 is equipped with at least one handlebar 118, 119, e.g. one or two handlebars 118, 119 so that the handlebar 118 is at the end 112 or 113, or there is one handlebar 118 at the end 112 and one handlebar 119 at the end 113.

The cable joint 100 also comprises an inductance (MV) component 120 for limiting (minimizing) the capacitive earth fault current, when the coupled cables 101, 102 produce such current during faults, and connection terminals (points) 122a, 122b, 122c for coupling wires 103a, 103b, 103c of cables 101, 102.

These components 120, 122a, 122b, 122c are arranged into the space 110 inside the casing 104 so that those are sheltered by the casing 104. The connection terminals 122a, 122b, 122c are in connection with the inductance component 120, which is coupled parallelly to the cables 101, 102.

The cable (cabling) 101 coming from a station/feeder is connected to the primary (feeder)-side connection terminals 122a, 122b, 122c as the cable 102 continuing to load. The wires 103a, 103b, 103c of each cable 101, 102 are connected so that the wire 103a is connected to the terminal 122a, the wire 103b to the terminal 122b, and the wire 103c to the terminal 122c respectively on both feeder and load sides according to FIGS. 1a and 1c.

The inductance component 120 has an internal solid connection 124 to the casing 104 that acts as an inductance for limiting the earth fault current and a grounding point 126. The connection 124 as well as at least the components 120, 122a, 122b, 122c are encompassed by the casing 104.

FIG. 1c presents how the inductance component 120 comprises a ZN transformer 128, which comprises windings 129, and it is connected to the casing 104 from its neutral side.

The cable joint 100 is rigid and non-influenced by weather and outside effects since the cable joint 100 is underground and shielded.

It is accurate when eliminating conductive currents on a cable scale and relatively easy to scale e.g. just by comparing capacitive current limiting ability to those earth fault current values in the table of FIG. 2.

The cable joint 100 does not require an automation, extra measurement equipments, adjusting after the scaling, or special installation training because its simple structure.

The prior art transmission joints are replaced with this compensating type of cable joint 100 that brings inductance to a line to compensate the capacitive component of the fault current. The ZN transformer 128 is so small that e.g. two persons can handle it and its connection to e.g. 20 kV cables 101, 102 takes about two hours. The cable joint 100 functions as a cable joint and a compensation unit at the same time, and after measurement it can be buried in the ground, possibly with concrete shielding.

Compared to that, when each cable 101, 102 has a compensation unit, the fault only affects that particular feeder. Also, the station is always compensated, because it is targeted to the compensation of the cables 101, 102, not the whole station, and depending on the placement of the cable joint 100, the occurring fault might not affect energy delivery at all.

The cable joint 100 limits the capacitive earth fault currents during faults and enables safe use according to regulations without expensive systems such as Peterson coil.

The invention claimed is:

1. A transmission cable joint for a medium voltage underground cable system, comprising at least
    a casing and
    connection terminals,
    wherein the casing encompasses components of the cable joint,
    wherein the connection terminals belong to the components of the cable joint,
    wherein the connection terminals is configured to couple wires of medium voltage transmission cables so that the cables are coupled to each other,
    characterized in that
    the cable joint further comprises a casing-encompassed inductance component that is connected with the connection terminals for limiting capacitive earth fault current, when the coupled cables produce such current.

2. The cable joint according to claim 1, wherein the casing acts as a grounding point.

3. The cable joint according to claim 1, wherein the inductance component is coupled parallelly to the cables and it has an internal connection to the casing.

4. The cable joint according to claim 3, wherein the inductance component comprises a ZN transformer that is connected from its neutral side to the casing.

5. The cable joint according to claim 1, wherein the casing encompasses at least the connection terminals, the inductance component, and the solid connection.

6. The cable joint according to claim 1, wherein the casing comprises two casing parts with bolt flanges and the casing parts are attached to each other by means of bolts through the bolt flanges.

7. The cable joint according to claim 1, wherein the casing comprises a cable opening for each medium voltage transmission cable to be coupled and a watertight seal for each cable opening.

8. The cable joint according to claim 1, wherein the casing comprises at least one handlebar to carry the portable cable joint.

* * * * *